May 12, 1953 W. A. TRAPEUR 2,638,133
LINE UP TROUGH FOR RESAWING MACHINES
Filed Dec. 12, 1951
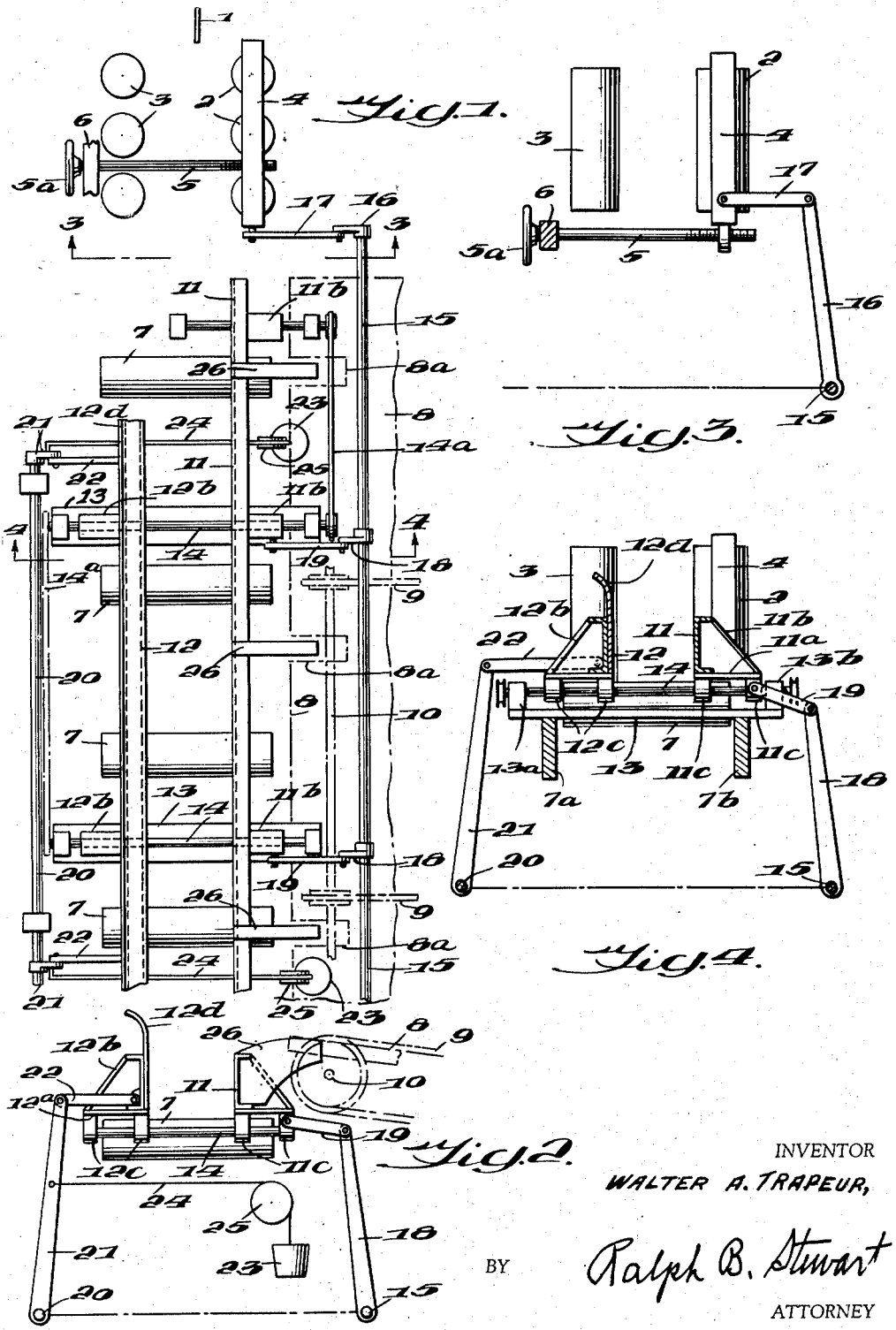
INVENTOR
WALTER A. TRAPEUR,
BY Ralph B. Stewart
ATTORNEY Patented May 12, 1953

2,638,133

UNITED STATES PATENT OFFICE 2,638,133

LINE UP TROUGH FOR RESAWING MACHINES

Walter A. Trapeur, Sutherlin, Oreg.

Application December 12, 1951, Serial No. 261,308

7 Claims. (Cl. 143—4)

This invention relates to sawmill machinery and in particular to machines for resawing cants or timbers from which slabs have already been sawed.

More specifically, my invention relates to an arrangement for use in connection with resawing machines to insure that the cant is properly aligned with the feed-rolls of the resawing machine before the cant enters the feed-rolls.

In present-day operation of resawing machines, it is common to employ two men to line up the cants with respect to the resawing machine as the cants are deposited in front of the machine from the transfer chains. One man is positioned immediately at the resawing machine and the other man handles the other end of the cant. Notwithstanding the fact that a man is provided at each end of the cant, it frequently happens that a cant reaches the feed-rolls before it is properly aligned, and this is due partly to the fact that in a modern resawing machine the cant is fed to the machine at a speed of from 200 to 500 feet per minute and the operators do not always have time to properly align the cant before it reaches the feed-rolls. When a cant is fed to the resawing machine without proper alignment, the saw snips the end of the board, which results in an unnecessary waste, and the saw is subjected to considerable strain when the cant is moved to secure proper alignment after it reaches the saw.

An object of my invention is to devise an arrangement for securing automatic lining-up of the cant as each cant is deposited from the transfer chains on the live rolls to be fed into the resawing machine.

One advantage of my line-up trough is that it eliminates one man in the operation of the resawing machine and thereby reduces the cost of operation. Another, and perhaps the greatest advantage, is that my line-up trough eliminates the human error in the line-up operation and secures proper lining-up without attention from the operator, thus eliminating the snipping of the end of the board.

One form of my invention is illustrated in the accompanying drawing, in which:

Figure 1 is a plan view, in diagrammatic representation, of a resawing machine equipped with my line-up trough.

Figure 2 is an end view of Figure 1 taken from the outer end of the line-up trough.

Figure 3 is a sectional view of Figure 1 taken along the line 3—3.

Figure 4 is a sectional view of Figure 1 taken along the line 4—4.

Referring to the drawing, the various figures illustrate the invention and the resawing machine in skeleton or diagrammatic form to illustrate the principle of operation of the invention, various structural details being omitted for the sake of clarity of illustration.

My invention is applied to any conventional form of resawing machine having a saw-blade 1 located immediately behind two sets of feed-rolls 2 and 3, which operate in the usual manner to feed cants to the blade 1 to be resawed. Both sets of feed-rolls are mounted to move towards and away from each other. Rolls 2 are the gage or "set" rolls which determine the thickness of the board which is sawed from the cant in the resawing machine. This set of rolls is mounted in a suitable movable frame, represented at 4, and is movable transversely of the resawing machine by conventional means, represented by the screw 5, which passes through a frame-member 6 and has threaded engagement with a part of the frame 4. By adjusting the hand-wheel 5a of the screw 5, the feed-rolls 2 may be moved to the proper position for sawing from the cant a board of the desired thickness. The feed-rolls 3, commonly known as the "pressure" rolls, are also mounted for movement transversely of the machine to accommodate cants of different widths. The arrangement for mounting and moving the pressure rolls has not been illustrated since such arrangement is conventional and forms no part of the present invention.

Cants to be resawed are fed to the resawing machine from a number of live feed-rolls 7 mounted in spaced horizontal relation upon a bed formed of parallel frame-members 7a and 7b, see Figure 4. These rolls are driven by suitable means, not shown, to feed a cant towards the resawing machine at the desired speed. The squared timbers or cants are deposited upon the horizontal feed-rolls 7 from an inclined transfer deck or ramp 8 by means of transfer chains 9 forming part of the transfer mechanism and being driven by shaft 10. The transfer mechanism, including the deck 8, chains 9 and shaft 10, have been shown in dotted lines to avoid confusion with the structure located beneath the deck.

The parts described above are parts of a conventional resawing machine, and the following description is concerned with the present invention.

My invention involves a trough structure formed of two vertical wall members arranged in parallel relation above the horizontal feed-rolls 7 and adapted to engage opposite sides of the cant to be resawed. Both side walls of the trough are movable tranversely of the row of feed-rolls. One of the side walls, which would be referred to as the "set" wall, is connected by suitable means for movement with the movement of the feed-rolls 2 of the resawing machine and remains in alignment with these rolls at all times. The other side wall of the trough is mounted for "floating" movement with respect to the "set" wall, and is normally biased by yieldable means toward the set wall.

Again referring to the drawing, the set wall of my line-up trough is shown at 11 and conveniently may be formed of a channel iron arranged on-edge and extending throughout the length of the bed which supports the horizontal feed-rolls 7. The floating wall of the trough also may be formed of a channel iron 12 mounted parallel with the wall 11 above the rolls 7, but in this case the floating wall is terminated short of the resawing machine to provide a space in which the operator of the resawing machine may have access to the front end of the cant for the purpose of turning the cant to the proper position within the trough.

Both side walls of the trough are mounted for sliding movement transversely of the trough and, preferably, these walls are mounted upon a number of transverse slides supported upon frame-members 7a and 7b at points spaced along these members. As shown in Figure 4, each transverse slide includes a cross-piece 13 arranged across the upper edges of frame-members 7a and 7b, and supporting a pair of bearings 13a and 13b at the two ends. A shaft 14 is journaled in bearings 13a and 13b and is rotated continuously by any suitable means, represented by the belts 14a in Figure 1.

Immediately above each shaft 14, channel iron 11 is provided with a mounting bracket formed of a horizontal plate 11a secured to the lower flange of the channel and extending outwardly over shaft 14, and an inclined plate 11b secured to the upper flange at its upper end and to the outer end of the plate 11a. If desired, a web plate may be inserted in the space between the channel 11 and the plates 11a and 11b for additional strength. Each plate 11a is supported upon a pair of spaced bearing blocks 11c, which are journaled upon shaft 14. As shown in Figure 4, channel iron 12 is supported upon shaft 14 in similar manner by bracket plates 12a, 12b, and spaced bearing blocks 12c which are journaled upon shaft 14.

The floating wall of the trough differs from the set wall in that it is provided on its inner face with a metal plate 12d which extends above the upper flange of channel 12 and is curved outwardly from the trough, for the purposes indicated below.

The arrangement for moving the set wall 11 of the line-up trough to maintain this wall in alignment with the feed-rolls 2 of the resawing machine includes a shaft 15 journaled in suitable bearings and mounted at or somewhat below floor level. This shaft extends throughout the length of the line-up trough and is connected at its forward end with the movable frame 4 of the feed-rolls 2 by means of a vertically extending lever 16 secured at its lower end to the shaft 15 and pivotally connected at its upper end with the frame 4 by means of a link 17. At each transverse slide location shaft 15 is also provided with a vertically extending lever 18 which is pivotally connected at its upper end to a part of the set wall 11 by means of a link 19. As shown in Figure 4, the inner end of the link 19 is pivotally connected with one of the bearing blocks 11c. The levers 16 and 18 and the links 17 and 19 are so designed and arranged that the inner face of the set wall 11 is in alignment with the inner surfaces of the feed-rolls 2 of the resawing machine, and any movement of the feed-rolls causes a corresponding movement of the set wall 11, so that this wall remains in proper alignment for all adjustments of the feed-rolls 2.

For the purpose of maintaining the floating wall 12 of the trough in parallel relation with the set wall 11, a shaft 20 is journaled in suitable bearings at or below floor level and is provided at spaced points with upwardly extending levers 21 which are pivotally connected at their upper ends to a suitable point on the floating wall 12 by links 22. Thus, movement of one end of the wall 12 results in a corresponding movement of the other end through the connection by way of shaft 20. The floating wall 12 is normally biased for movement towards the set wall 11, and one suitable biasing arrangement illustrated in the drawing involves suitable weights 23 suspended from flexible ropes or chains 24 passing over pulley 25 and being connected to the lever 21. Suitable stops may be provided at each transverse slide position to prevent the floating wall from going beyond the middle of the trough, or beyond any other desired location.

Since the set wall 11 of the line-up trough moves toward and away from the transfer deck 8, it is necessary to provide some means of bridging the gap between the wall and the deck when the wall moves away from the deck. For this purpose a number of transversely extending bridging arms 26 are mounted on the wall 11 and extend into notches 8a formed in the edge of the deck 8. As shown in Figure 2, these arms bridge the gap between the deck 8 and the wall 11 so that cants delivered by the transfer chains 9 will be deposited in the trough and will not become lodged in the gap between the wall 11 and the deck 8. Due to the fact that the floating wall 12 is always urged towards the wall 11 by yieldable biasing means, the trough is always of less width than the cant to be resawed. Accordingly, when a cant is delivered from the transfer deck to the trough, the cant first engages the upwardly and outwardly curved plate 12d carried on the face of the floating wall 12 and pushes the floating wall away from the set wall 11 and permits the cant to rest upon the live rolls 7. If the cant is not in the right position for sawing, the operator of the resawing machine can easily turn the cant about its axis to the proper position before the cant reaches the feed-rolls of the resawing machine.

The operation of my line-up trough is believed to be clear from the foregoing description. It will be understood that the biasing weights 23 acting on the floating wall 12 will push the cant into engagement with the inner face of the wall 11 and thus automatically line up the cant with respect to the feed-rolls 2 of the resawing machine. The pressure exerted by the floating wall 12 is not sufficient to prevent the feeding of the cant into the resawing machine by the horizontal live rolls 7, but it is sufficient to maintain the cant in contact with the set wall 11. Since the set wall 11 is interlocked for simultaneous movement with the set rolls 2 by means of the shaft 15 and the connecting levers and links, the wall 11 remains in proper alignment with the rolls 2 for all adjustments of the set rolls 2.

It will also be understood that the continuous rotation of the shafts 14, forming the transverse slide supports for the two walls of the line-up trough, eliminates the static friction of the supporting slides, and either wall may be moved easily and quickly by applying force at any point along the length of the wall, or by rotating the connected shafts 15 or 20 by force applied at any point along their lengths.

Some advantage can be obtained by my invention by the use of the set or guide wall 11 and without the use of the floating wall 12. For example, the cants may be manually moved into and held in engagement with the guiding force of the set wall 11, or some other form of yieldable means may be used for moving and holding the cants against the set wall 11.

What I claim is:

1. In a resawing machine in which a set of vertical feed-rolls are mounted in a transversely movable support and a set of horizontal live rolls are arranged to move cants into feeding engagement with said feed-rolls, the combination of a line-up trough comprising a pair of parallel side walls arranged above said horizontal rolls and extending parallel with the feeding axis of said vertical rolls, means mounting both of said walls for movement transversely of the trough, means interlocking said movable feed-roll support and one of said trough walls for simultaneous movement of said trough wall with movement of said vertical rolls to maintain the inner face of said one trough wall in alignment with the inner surfaces of said feed-rolls, and yieldable biasing means for urging the other trough wall towards said one trough wall.

2. In a resawing machine in which a set of vertical feed-rolls are mounted in a transversely movable support and a set of horizontal live rolls are arranged to move cants into feeding engagement with said vertical rolls and cants are moved onto said horizontal rolls from a transfer deck arranged parallel with the set of horizontal rolls, the combination of a line-up trough comprising a pair of parallel side walls arranged above said horizontal rolls and extending parallel with said transfer deck, means mounting both of said walls for movement transversely of the trough, means interlocking said movable feed-roll support with the trough wall nearest said deck for simultaneous movement of said interlocked wall with movement of said vertical rolls to maintain the inner face of said interlocked trough wall in alignment with the inner surfaces of said vertical rolls, a plurality of transversely extending arms carried by said interlocked wall and bridging the gap between said deck and said interlocked wall, and yieldable biasing means for urging the other trough wall towards said interlocked trough wall.

3. In a resawing machine in which a set of vertical feed-rolls are mounted in a transversely movable support and a set of horizontal live rolls are arranged to move cants into feeding engagement with said vertical rolls and cants are moved onto said horizontal rolls from a transfer deck arranged parallel with the set of horizontal rolls, the combination of a line-up or cant-guiding wall arranged above said horizontal rolls and extending parallel with said transfer deck, means mounting said wall for movement transversely of said set of horizontal rolls, means interlocking said movable feed-roll support with the line-up wall for simultaneous movement of said guide wall with movement of said vertical rolls to maintain the guiding face of said guide wall in alignment with the inner surfaces of said vertical rolls, and a plurality of transversely extending arms carried by said guide wall and bridging the gap between said deck and said guide wall.

4. A machine according to claim 1 wherein said means for mounting said walls for transverse movement comprises a plurality of transverse slides spaced along the length of said walls, each slide comprising a rotary shaft arranged transversely beneath said walls, and bearing blocks journaled upon said shaft and supporting said walls.

5. A machine according to claim 3 wherein said means for interlocking the movable feed-roll support with the line-up wall comprises a rotary shaft arranged parallel with said line-up wall and beneath said transfer deck, a vertically arranged lever secured to one end of said shaft, a link pivotally connecting the upper end of said lever with said feed-roll support, a plurality of additional vertically arranged levers mounted upon said shaft at spaced points adjacent said line-up wall, and link elements pivotally connecting the upper ends of said additional levers with said line-up wall at points spaced along the length thereof.

6. In a resawing machine in which a set of vertical feed-rolls are mounted in a transversely movable support and a set of horizontal live rolls are arranged to move cants into feeding engagement with said feed-rolls, the combination of a cant-guiding wall arranged above said horizontal rolls and extending parallel with the feeding axis of said vertical rolls, means mounting said guide wall for movement transversely of said feeding axis, means interlocking said movable feed-roll support and said guide wall for simultaneous movement of said vertical rolls to maintain the guiding face of said guide wall in alignment with the inner surfaces of said feed-rolls.

7. A machine according to claim 2 wherein said other trough wall is provided with a guide plate on its inner face extending above the floor of said deck and being curved outwardly from the inner face of said other wall, whereby cants deposited in said trough engage said guide plate and move said other wall outwardly.

WALTER A. TRAPEUR.

References Cited in the file of this patent

UNITED STATES PATENTS

| Number | Name | Date |
|--------|------|------|
| 657,666 | Melby | Sept. 11, 1900 |
| 902,502 | Mereen et al. | Oct. 27, 1908 |
| 936,314 | Dittbenner | Oct. 12, 1909 |